United States Patent
Fujita et al.

(10) Patent No.: US 11,651,174 B2
(45) Date of Patent: May 16, 2023

(54) INFORMATION PROCESSING DEVICE, INFORMATION MANAGEMENT SYSTEM, AND STORAGE MEDIUM

(71) Applicant: FUJIFILM BUSINESS INNOVATION CORP., Tokyo (JP)

(72) Inventors: Mamoru Fujita, Yokohama (JP); Akira Mihara, Ebina (JP); Takeshi Zengo, Yokohama (JP); Atsuyuki Kitamura, Ebina (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 72 days.

(21) Appl. No.: 17/243,780

(22) Filed: Apr. 29, 2021

(65) Prior Publication Data
US 2022/0108095 A1 Apr. 7, 2022

(30) Foreign Application Priority Data
Oct. 2, 2020 (JP) .............................. JP2020-167758

(51) Int. Cl.
*G06K 7/14* (2006.01)
*G01N 21/35* (2014.01)
*G01N 22/00* (2006.01)
*G01N 27/72* (2006.01)

(52) U.S. Cl.
CPC ........... *G06K 7/1417* (2013.01); *G01N 21/35* (2013.01); *G01N 22/00* (2013.01); *G01N 27/72* (2013.01)

(58) Field of Classification Search
CPC ...... G06K 7/1417; G01N 22/00; G01N 21/35; G01N 27/72

USPC .......................................... 235/492.1, 462.1
See application file for complete search history.

(56) References Cited

U.S. PATENT DOCUMENTS

| | | | |
|---|---|---|---|
| 9,740,900 B1 * | 8/2017 | Wilson | G06Q 20/10 |
| 10,762,404 B1 * | 9/2020 | Correa | G06K 19/027 |
| 2008/0270219 A1 * | 10/2008 | Antinori | G06Q 30/02 705/7.32 |
| 2013/0151434 A1 * | 6/2013 | Chandaria | G06Q 10/0832 705/333 |
| 2014/0094701 A1 * | 4/2014 | Kwartowitz | A61B 8/5223 600/438 |
| 2018/0204280 A1 * | 7/2018 | Painter | G06F 16/252 |

FOREIGN PATENT DOCUMENTS

| | | |
|---|---|---|
| EP | 1 898 362 A1 | 3/2008 |
| EP | 2 395 471 A2 | 12/2011 |
| FR | 3 067 846 A1 | 12/2018 |
| JP | H07-012855 B2 | 2/1995 |
| JP | H11-025369 A | 1/1999 |
| JP | 2008-188868 A | 8/2008 |
| JP | 2009-100225 A | 5/2009 |
| JP | 2009-211591 A | 9/2009 |

OTHER PUBLICATIONS

Oct. 28, 2021 extended Search Report issued in European Patent Application No. 21173553.5.

* cited by examiner

*Primary Examiner* — Allyson N Trail
(74) *Attorney, Agent, or Firm* — Oliff PLC

(57) ABSTRACT

An information processing device includes a sensor configured to detect a substance applied to a medium containing confidential information and a processor configured to record information including substance information identifying the substance detected with the sensor and user information on a user carrying the medium in combination.

13 Claims, 9 Drawing Sheets

FIG. 4

| DOCUMENT ID 111 | BRINGING-OUT PERSON ID 112 | DETECTION DATE AND TIME 113 | DETECTION METHOD 114 | DETECTION RESULT 115 | LOCATION INFORMATION 116 |
|---|---|---|---|---|---|
| 0001 | 0001 | 2020/8/1 16:00 | MILLIMETER WAVES | OK | X1,Y1 |
| 0001 | 0001 | 2020/8/1 17:00 | MILLIMETER WAVES | NG | X2,Y2 |

| DOCUMENT ID 211 | PRINTING PERSON ID 212 | SCHEDULED BRINGING-OUT PERSON ID 213 | PASSING FLAG 214 | PASSING DATE AND TIME 215 | LOCATION INFORMATION 216 | FINAL DETECTION DATE AND TIME 217 | SCHEDULED DISCARD DATE AND TIME 218 | DISCARD DATE AND TIME 219 |
|---|---|---|---|---|---|---|---|---|
| 0001 | 0001 | 0001 | 1 | 2020/8/1 13:00 | X2,Y2 | 2020/8/1 17:00 | 2020/8/5 12:00 | |
| 0002 | 0002 | 0003 | 0 | | X3,Y3 | 2020/8/1 15:00 | | |

210

INFORMATION PROCESSING DEVICE, INFORMATION MANAGEMENT SYSTEM, AND STORAGE MEDIUM

CROSS-REFERENCE TO RELATED APPLICATIONS

This application is based on and claims priority under 35 USC 119 from Japanese Patent Application No. 2020-167758 filed on Oct. 2, 2020.

BACKGROUND

Technical Field

The present invention relates to an information processing device, an information management system, and a storage medium.

Related Art

Various techniques to track an article have been disclosed. JP-A-11-25369 discloses an invention of a tag detection method for detecting movement of an article by identifying a tag made of a magnetic material and detecting theft of a product or the like in a store or the like.

JP-A-2009-211591 discloses an invention of a document management system capable of checking a location of a document or the like even when the document is brought out from a secret division area. The document management system of JP-A-2009-211591 stores a warning recipient for each user, and when a document is detected by a document detection device that detects a document of a gate that includes the document detection device and a personal authentication device that authenticates a user carrying the document, the document management system notifies a warning to the warning recipient of the user authenticated by the personal authentication device stored in a user DB.

JP-A-2009-100225 discloses an invention of an information distribution grasping system capable of grasping a distribution state of information using paper as a medium. The information distribution grasping system of JP-A-2009-100225 stores a log that expresses a distribution status of information in association with an identifier of a user, acquires a distribution status of information corresponding to an identified identifier of a user, so as to analyze a list of information and a distribution route of the information corresponding to the identifier of the user, and to present to the user the list of information and the distribution route of the information corresponding to the identifier of the user.

JP-B2-7-12855 discloses an invention of a package sorting system that only reads a barcode printed with a special ink on a surface of a waybill attached to a package, and can automatically and reliably sort the barcode and perform an overall management by a host computer of a center.

SUMMARY

When a medium such as paper on which confidential information is printed or an envelope in which the paper is enclosed is carried, it may be desirable to check the presence of the medium regardless of a location of the medium.

Aspects of non-limiting embodiments of the present disclosure relate to an information processing device, an information management system, and a computer readable medium storing a computer program for checking presence of a medium, such as paper on which confidential information is printed or an envelope in which the paper is enclosed, regardless of a location of the medium.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including: a sensor configured to detect a substance applied to a medium containing confidential information; and a processor configured to record information including substance information identifying the substance detected with the sensor and user information on a user carrying the medium in combination.

BRIEF DESCRIPTION OF DRAWINGS

Exemplary embodiment(s) of the present invention will be described in detail based on the following figures, wherein:

FIG. 4 is a diagram illustrating information recorded in a storage by a recording unit of the information processing device;

FIG. 7 is a diagram illustrating information recorded in the storage by a recording unit of the information storage device;

DETAILED DESCRIPTION

Figure 1:
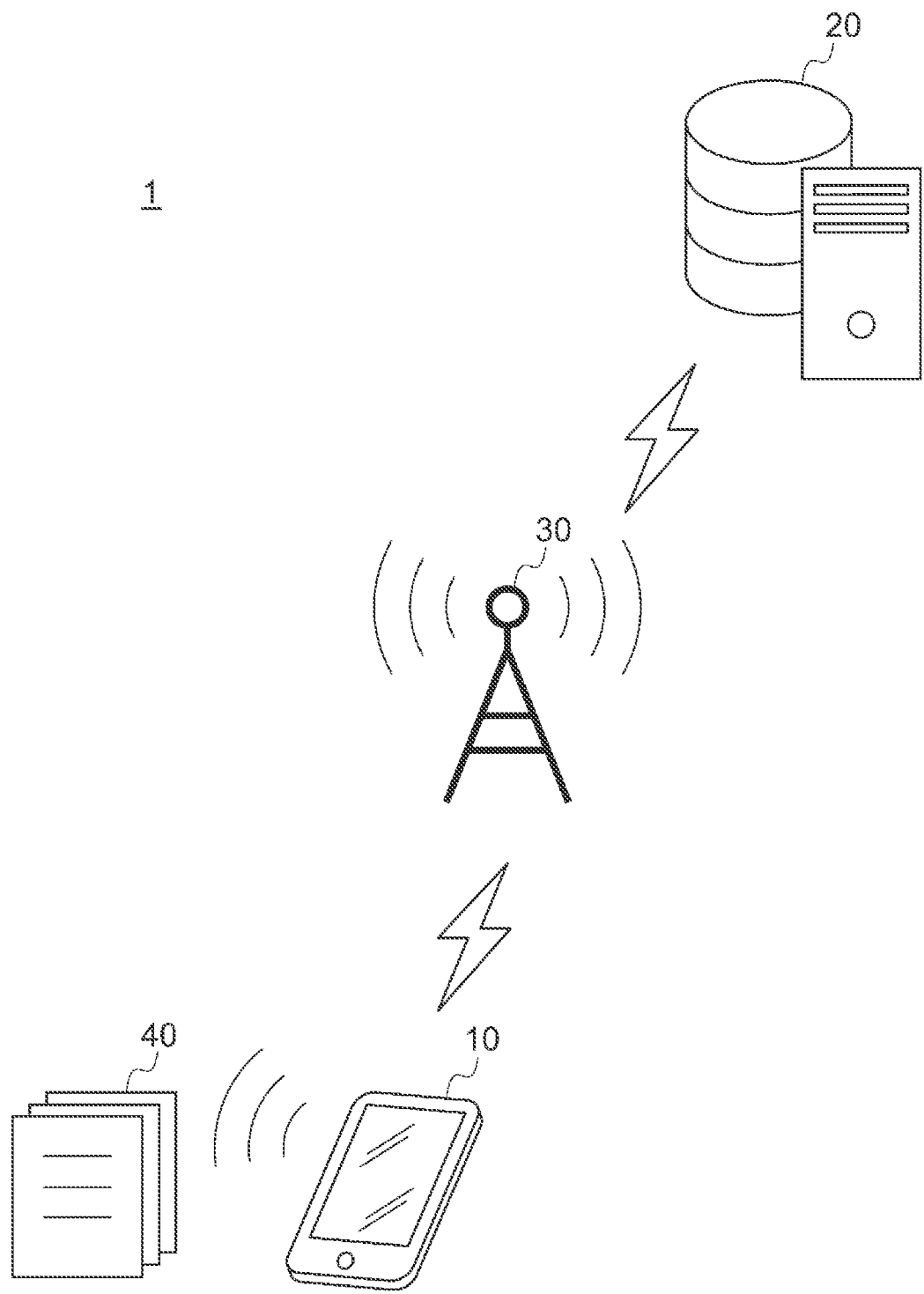
FIG. 1 is a diagram illustrating a schematic configuration of a confidential information management system according to an exemplary embodiment.

Hereinafter, an exemplary embodiment of the present invention will be described with reference to the drawings. In the drawings, the same or equivalent components and portions are denoted by the same reference numerals. In addition, dimensional ratios in the drawings are exaggerated for convenience of description, and may be different from actual ratios.

FIG. 1 is a diagram illustrating a schematic configuration of a confidential information management system according to an exemplary embodiment. As illustrated in FIG. 1, a confidential information management system 1 includes an information processing device 10 and an information storage device 20.

The information processing device 10 is, for example, a portable device such as a smartphone or a tablet terminal. The information processing device 10 includes a sensor. The sensor is a sensor capable of sensing the medium 40. The information processing device 10 is configured to communicate with the information storage device 20 through a network 30 such as the Internet. An example of information stored by the information processing device 10 will be described later.

The information storage device 20 is a server that stores information transmitted from the information processing device 10 or the like. The information storage device 20 stores, for example, information related to a printed matter that is output as the medium 40 or that is enclosed in the medium 40. The information storage device 20 stores, for example, information for tracking the medium 40. An example of information stored by the information storage device 20 will be described later.

The medium 40 is a recording medium such as paper, an envelope or a case for enclosing a recording medium. The medium 40 contains confidential information. In a case where the medium 40 is paper, the confidential information is printed on the medium 40. In a case where the medium 40 is an object for enclosing paper, such as an envelope or a case, the confidential information is printed on the paper enclosed in the medium 40, and thus confidential information is contained in the medium 40. The medium 40 may be carried together with the information processing device 10 by a user carrying the information processing device 10. The medium 40 includes a substance that is detectable with the sensor provided in the information processing device 10.

Examples of the substance that is detectable with a sensor and that is included in the medium 40 include an image such as a two-dimensional code, a passive radio frequency identifier (RFID) tag, a magnetic wire, a conductive ink, a volatile substance, a foaming ink, an alteration prevention seal, an open/close sensor, or the like.

When a confidential document printed on paper or the like is brought out of a management area such as an area within an office, following history may be tracked in order to prevent information leakage. It may be checked and monitored whether the user bringing out the confidential document always holds the confidential document, or whether there is evidence of a suspicious behavior such as leaving a prescribed route, for example stopping at a convenience store.

The information processing device 10 according to the present exemplary embodiment senses, with the sensor, the substance included in the medium 40 constantly or at a predetermined interval. By sensing the substance included in the medium 40 with the information processing device 10, it may be possible to grasp that the medium 40 is within a sensing range of the information processing device 10. Then, the information processing device 10 records a sensing result of the substance included in the medium 40 together with information on the user carrying the information processing device 10. The information processing device 10 transmits the recorded information to the information storage device 20 through the network 30. The information storage device 20 stores the information transmitted from the information processing device 10, and thereby manages information as to by which user the medium 40 is carried.

Figure 2:
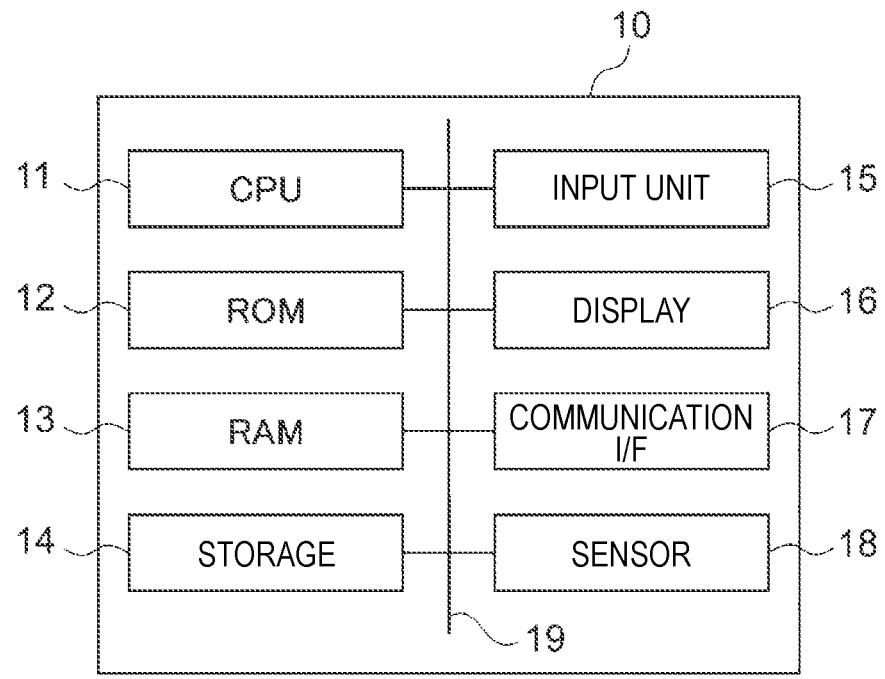
FIG. 2 is a block diagram illustrating a hardware configuration of the information processing device according to the present exemplary embodiment.

FIG. 2 is a block diagram illustrating a hardware configuration of the information processing device 10.

As illustrated in FIG. 2, the information processing device 10 includes a central processing unit (CPU) 11, a read only memory (ROM) 12, a random access memory (RAM) 13, a storage 14, an input unit 15, a display unit 16, a communication interface (I/F) 17, and a sensor 18. The respective components are connected to each other via a bus 19 so as to be able to communicate with each other.

The CPU 11 is a central processing unit, and executes various programs and controls each unit. That is, the CPU 11 reads the program from the ROM 12 or the storage 14, and executes the programs using the RAM 13 as a work area. The CPU 11 controls the above components and performs various types of arithmetic processing in accordance with the programs recorded in the ROM 12 or the storage 14. In the present exemplary embodiment, the ROM 12 or the storage 14 stores an information recording program for recording the result of sensing the medium 40 together with the information on the user of the information processing device 10.

The ROM 12 stores various programs and various data. The RAM 13 temporarily stores programs or data as a work area. The storage 14 is configured with a storage device such as a hard disk drive (HDD), a solid state drive (SSD), or a flash memory, and stores various programs including an operating system and various data.

The input unit 15 includes a pointing device such as a mouse and a keyboard, and is used to perform various inputs.

The display unit 16 is, for example, a liquid crystal display, and displays various information. The display unit 16 may function as the input unit 15 by employing a touch panel method.

The communication interface 17 is an interface for communicating with other devices such as the information storage device 20, and is, for example, a standard such as Ethernet (registered trademark), FDDI, or Wi-Fi (registered trademark).

The sensor 18 is a sensor that detects the substance included in the medium 40. In a case where the substance included in the medium 40 is an image such as a two-dimensional code, the sensor 18 is a camera module including a lens and an imaging element. In a case where the substance included in the medium 40 is a passive RFID tag, the sensor 18 is an RFID reader. In a case where the substance included in the medium 40 is a magnetic wire, the sensor 18 is a camera module including a lens and an imaging element. In a case where the substance included in the medium 40 is a conductive ink that absorbs radio waves of millimeter waves, the sensor 18 is a millimeter wave sensor. The millimeter wave as used herein includes a radio wave in a frequency range of 30 GHz or more and 300 GHz or less, i.e. "millimeter wave", a radio wave in a frequency range of 300 GHz or more and 3000 GHz (=3 THz) or less, i.e. "submillimeter wave", and a radio wave in a frequency range of 3 THz or more and 5 THz or less, i.e. "terahertz wave". In a case where the substance included in the medium 40 is an odorless volatile substance, the sensor 18 is a gas sensor that detects odorless gas. In a case where the substance included in the medium 40 is unevenness formed by foaming ink, the sensor 18 is an infrared camera module including a lens and an imaging element for receiving light reflected from the unevenness to which a vertical cavity surface emitting laser (VCSEL) as a light source projects light, for example. In a case where the substance included in the medium 40 is an alteration prevention seal, the sensor 18 is a camera module including a lens and an imaging element. In a case where the substance included in the medium 40 is an open/close sensor, the sensor 18 is an antenna that receives radio waves emitted from the open/close sensor. Of course, the above-listed sensors are merely examples, and it is needless to say that any sensors may be selected as appropriate in accordance with the substance included in the medium 40.

The information processing device 10 may include, as the sensor 18, a location information sensor that acquires information on a current location, such as a Global Positioning System (GPS) sensor.

When the above-described information recording program are executed, the information processing device 10 implements various functions using the above-described hardware resources. A functional configuration implemented by the information processing device 10 will be described.

Figure 3:
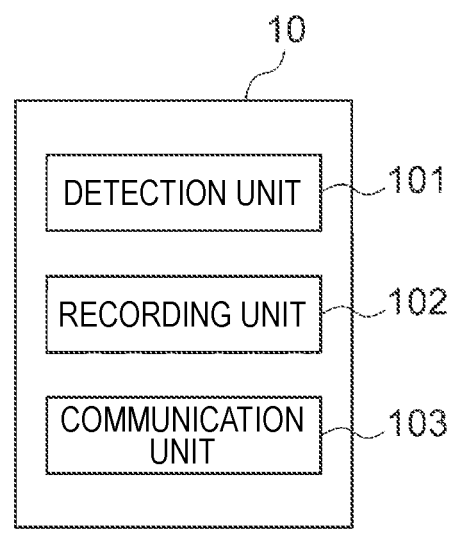
FIG. 3 is a block diagram illustrating an example of a functional configuration of the information processing device according to the present exemplary embodiment.

FIG. 3 is a block diagram illustrating an example of the functional configuration of the information processing device 10.

As illustrated in FIG. 3, the information processing device 10 includes, as functional configurations, a detection unit 101, a recording unit 102, and a communication unit 103. Each functional configuration is realized by the CPU 11 reading and executing an information recording program stored in the ROM 12 or the storage 14.

The detection unit 101 detects presence of the substance included in the medium 40 using the sensor 18. Detection of the substance with the detection unit 101 may be performed constantly, at a predetermined interval, or based on an instruction from the information storage device 20.

The recording unit 102 records, in the storage 14, a detection result of the substance with the detection unit 101. When recording the detection result of the substance, the recording unit 102 also records information on the user carrying the information processing device 10. In a case where the substance is not detected, a notification that the substance is not detected may be given to the information processing device 10 of the user carrying the medium 40 using at least one of an audible alert, vibration, a screen notification or the likes. In a case where the sensor 18 includes a location information sensor, the recording unit 102 also records information on the current location acquired by the location information sensor when recording the detection result of the substance.

FIG. 4 is a diagram illustrating the information recorded in the storage 14 by the recording unit 102. As shown in FIG. 4, the information 110 recorded in the storage 14 by the recording unit 102 includes a document ID 111, a bringing-out person ID 112, a detection date and time 113, a detection method 114, a detection result 115, and a location information 116.

The document ID 111 is information for identifying a document to be brought out as the medium 40, and is information transmitted from the information storage device 20 to the information processing device 10 and registered in the information processing device 10 when the medium 40 is brought out. The document ID 111 may be registered in the information processing device 10 by the user inputting information on the document to the information processing device 10 when the medium 40 is brought out. The bringing-out person ID 112 is information for identifying the user carrying the medium 40, and is information transmitted from the information storage device 20 to the information processing device 10 and registered in the information processing device 10 when the medium 40 is brought out. The bringing-out person ID 112 may be registered in the information processing device 10 by the user inputting information on the user to the information processing device 10 when the medium 40 is brought out. The detection date and time 113 is date and time when the substance included in the medium 40 is detected with the sensor 18. The detection method 114 is a method for detecting the substance included in the medium 40. The detection result 115 is a detection result of the substance included in the medium 40. The location information 116 is location information on the information processing device 10 at the date and time at which the detection is performed.

The communication unit 103 communicates with another device, for example, the information storage device 20. The communication unit 103 transmits the information 110 recorded in the storage 14 to the information storage device 20 instantly or at a predetermined timing.

Figure 5:
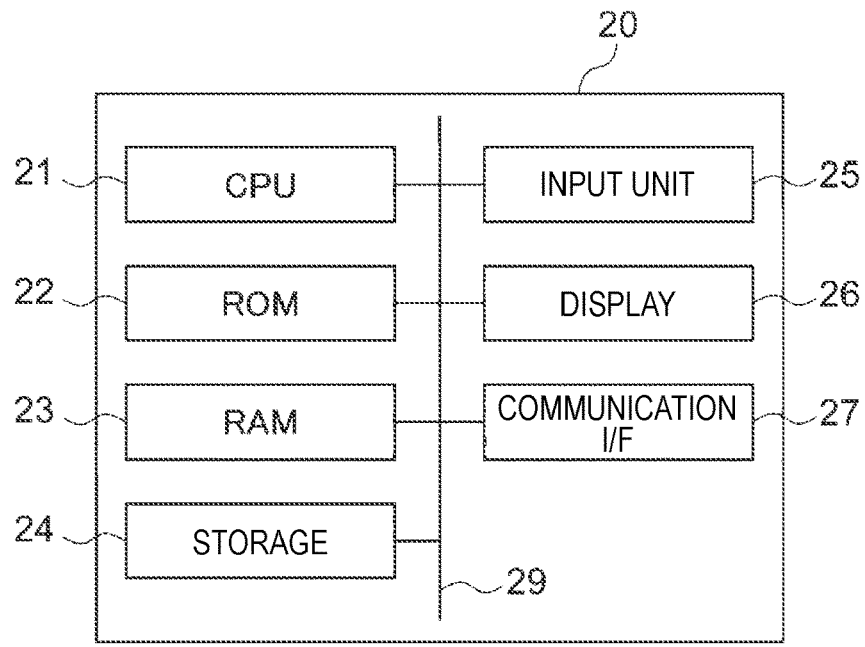
FIG. 5 is a block diagram illustrating a hardware configuration of an information storage device according to the present exemplary embodiment.

FIG. 5 is a block diagram illustrating a hardware configuration of the information storage device 20.

As illustrated in FIG. 5, the information storage device 20 includes a CPU 21, a ROM 22, a RAM 23, a storage 24, an input unit 25, a display unit 26, and a communication interface (I/F) 27. The respective components are connected to each other via a bus 29 so as to be able to communicate with each other.

The CPU 21 is a central arithmetic processing unit, and executes various programs and controls each unit. That is, the CPU 21 reads the program from the ROM 22 or the storage 24, and executes the programs using the RAM 23 as a work area. The CPU 21 controls the above components and performs various types of arithmetic processing in accordance with the programs recorded in the ROM 22 or the storage 24. In the present exemplary embodiment, the ROM 22 or the storage 24 stores an information processing program for recording information acquired from the information processing device 10 or the like and executing processing based on the recorded information.

The ROM 22 stores various programs and various data. The RAM 23 temporarily stores programs or data as a work area. The storage 24 is configured with a storage device such as an HDD, an SSD, or a flash memory, and stores various programs including an operating system and various data.

The input unit 25 includes a pointing device such as a mouse and a keyboard, and is used to perform various inputs.

The display unit 26 is, for example, a liquid crystal display, and displays various information. The display unit 26 may function as the input unit 25 by employing a touch panel method.

The communication interface 27 is an interface for communicating with other devices such as the information processing device 10, and is, for example, a standard such as Ethernet (registered trademark), FDDI, or Wi-Fi (registered trademark).

Figure 6:
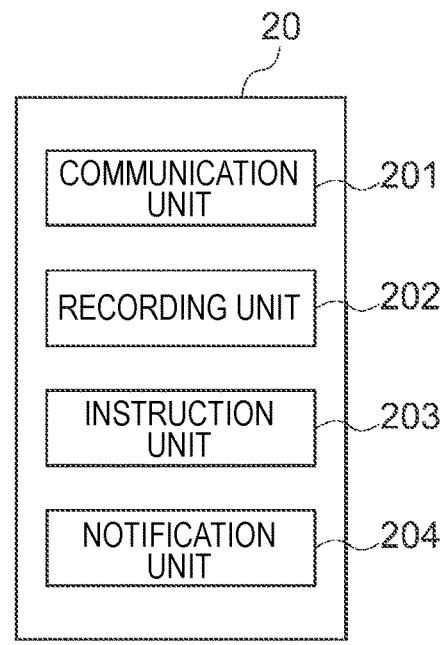
FIG. 6 is a block diagram illustrating an example of a functional configuration of the information storage device according to the present exemplary embodiment.

FIG. 6 is a block diagram illustrating an example of a functional configuration of the information storage device 20.

As illustrated in FIG. 6, the information storage device 20 includes, as functional configurations, a communication unit 201, a recording unit 202, an instruction unit 203, and a notification unit 204. Each functional configuration is realized by the CPU 21 reading and executing an information processing program stored in the ROM 22 or the storage 24.

The communication unit 201 communicates with another device, for example, the information processing device 10.

The recording unit 202 records, in the storage 24, information acquired by the communication unit 201 from another device, for example, the information processing device 10. Specifically, the recording unit 202 records the information on the location of the medium 40 in the storage 24.

FIG. 7 is a diagram illustrating information recorded in the storage 24 by the recording unit 202. As shown in FIG. 7, the information 210 recorded in the storage 24 by the recording unit 202 includes a document ID 211, a printing person ID 212, a scheduled bringing-out person ID 213, a passing flag 214, a passing date and time 215, a location information 216, a final detection date and time 217, a scheduled discard date and time 218, and a discard date and time 219. The recording unit 202 periodically records the information shown in FIG. 7 in the storage 24 for each document ID, and thus may track and manage a history of whether the user is carrying the medium containing the confidential information over time. Further, the recording unit 202 periodically records the location information in the storage 24, and thus may track and manage whether an unexpected route is used until reaching a destination over time.

The document ID 211 is information for identifying the document brought out as the medium 40. The printing person ID 212 is information for identifying a printing person who prints the document brought out as the medium 40. The scheduled bringing-out person ID 213 is information for identifying a scheduled bringing-out person that is scheduled to bring out the medium 40. The printing person and the scheduled bringing-out person may be the same person or different persons.

The passing flag 214 is a flag indicating whether a place for exiting from a predetermined area such as a managed area, including an entrance/exit gate of a company, is passed. The passing flag 214 is set, for example, to 1 if passed, and to 0 if not passed. The passing date and time 215 is information on a date and time when the user carrying the medium 40 passes through a place such as an entrance/exit gate of the company. The location information 216 is location information on the information processing device 10 at a date and time when the information processing device 10 detects the medium 40 corresponding to the document ID 211 of the record. The final detection date and time 217 is a date and time when the information processing device 10 finally detects the substance included in the medium 40 corresponding to the document ID 211 of the record with the sensor 18. The scheduled discard date and time 218 is information on the scheduled discard date and time of the document brought out as the medium 40 corresponding to the document ID 211 of the record. If no scheduled discard date and time is set to the document, no information is stored in the scheduled discard date and time 218. The discard date and time 219 is information on a date and time when the document brought out as the medium 40 is discarded. For example, a date and time of receiving the information indicating that the document is discarded from the information processing device 10 may be stored as the discard date and time 219.

When the user of the information processing device 10 brings out the medium 40, the instruction unit 203 instructs the information processing device 10 to detect the substance included in the medium 40. For example, at a timing when the passing flag 214 of the information 210 is set to 1, the instruction unit 203 instructs the information processing device 10 of the user carrying the medium 40 corresponding to the document ID 211 of the record to detect the substance included in the medium 40 constantly or at a predetermined interval.

When the instruction unit 203 instructs the information processing device 10 to detect the substance included in the medium 40, the instruction unit 203 may change an acquisition frequency of detection of the substance depending on whether the information processing device 10 is in the predetermined area or the information processing device 10 is outside the predetermined area. The instruction unit 203 may instruct the information processing device 10 such that the acquisition frequency of detection of the substance when the information processing device 10 is outside the predetermined area is higher than that when the information processing device 10 is within the predetermined area. The instruction unit 203 may reduce a power consumption of the information processing device 10 due to the detection of the substance by changing the acquisition frequency of the detection according to the location of the information processing device 10.

The notification unit 204 notifies the information processing device 10 and other devices of the various information related to the medium 40. For example, in a case where the substance included in the medium 40 is not detected with the sensor 18, the notification unit 204 notifies the information processing device 10 of the user carrying the medium 40 or the information processing device 10 of the administrator who manages the medium 40 that the substance is not detected using at least one of an audible alert, vibration, a screen notification or the likes. Further, in a case where the scheduled discard date and time is set to the medium 40, the notification unit 204 notifies the information processing device 10 of the user carrying the medium 40 or an information processing device 10 of an administrator who manages the medium 40 when the scheduled discard date and time is close or when the scheduled discard date and time elapses.

Next, the operation of the information processing device 10 will be described.

Figure 8:
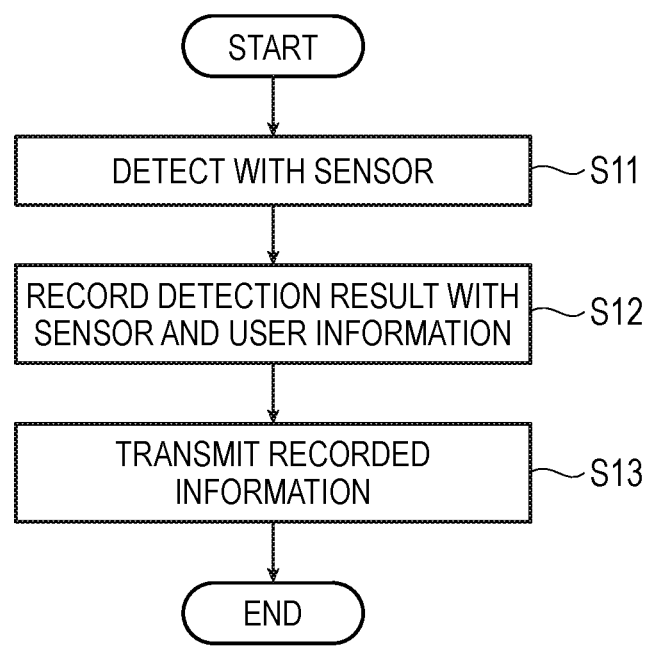
FIG. 8 is a flowchart showing a flow of information recording processing by the information processing device according to the present exemplary embodiment.

FIG. 8 is a flowchart showing a flow of information recording processing by the information processing device 10. The CPU 11 reads the information recording program from the ROM 12 or the storage 14, loads the information recording program into the RAM 13, and executes the program, thereby performing the information recording processing. The information recording processing shown in FIG. 8 is performed when the user of the information processing device 10 carries the medium 40 together with the information processing device 10. The information recording processing shown in FIG. 8 may be executed upon instruction from the information storage device 20.

The CPU 11 causes the sensor 18 to detect the substance included in the medium 40 (step S11).

Subsequent to step S11, the CPU 11 records, in combination in the storage 14, the detection result of the substance with the sensor 18 and the information on the user (step S12). The information recorded in the storage 14 in step S12 is the information 110 shown in FIG. 4. By recording, in combination in the storage 14, the detection result of the substance with the sensor 18 and the information on the user, the information processing device 10 may hold information for tracking the medium 40. In a case where the detection result of the substance indicates that the substance is not detected, a notification of the detection result may be given to the information processing device 10 of the user carrying the medium 40

Subsequent to step S12, the CPU 11 transmits the information recorded in the storage 14 to the information storage device 20 (step S13). The information storage device 20 stores information for tracking the medium 40 by storing the information transmitted from the information processing device 10. In addition, the information stored in the information storage device 20 is used to track the whereabouts of the medium 40 that is brought out. In a case where the detection result of the substance indicates that the substance is not detected, a notification of the detection result may be given to the information processing device 10 of the administrator who manages the medium 40 using an audible alert, vibration, a screen notification or the likes in addition to the storing of the information.

[Use Case 1]

Next, a use case example of the confidential information management system 1 according to the present exemplary embodiment will be described. As a first use case, an example case will be described in which a confidential document is printed in an office and an employee brings out the printed confidential document to the outside of the office.

Figure 9:
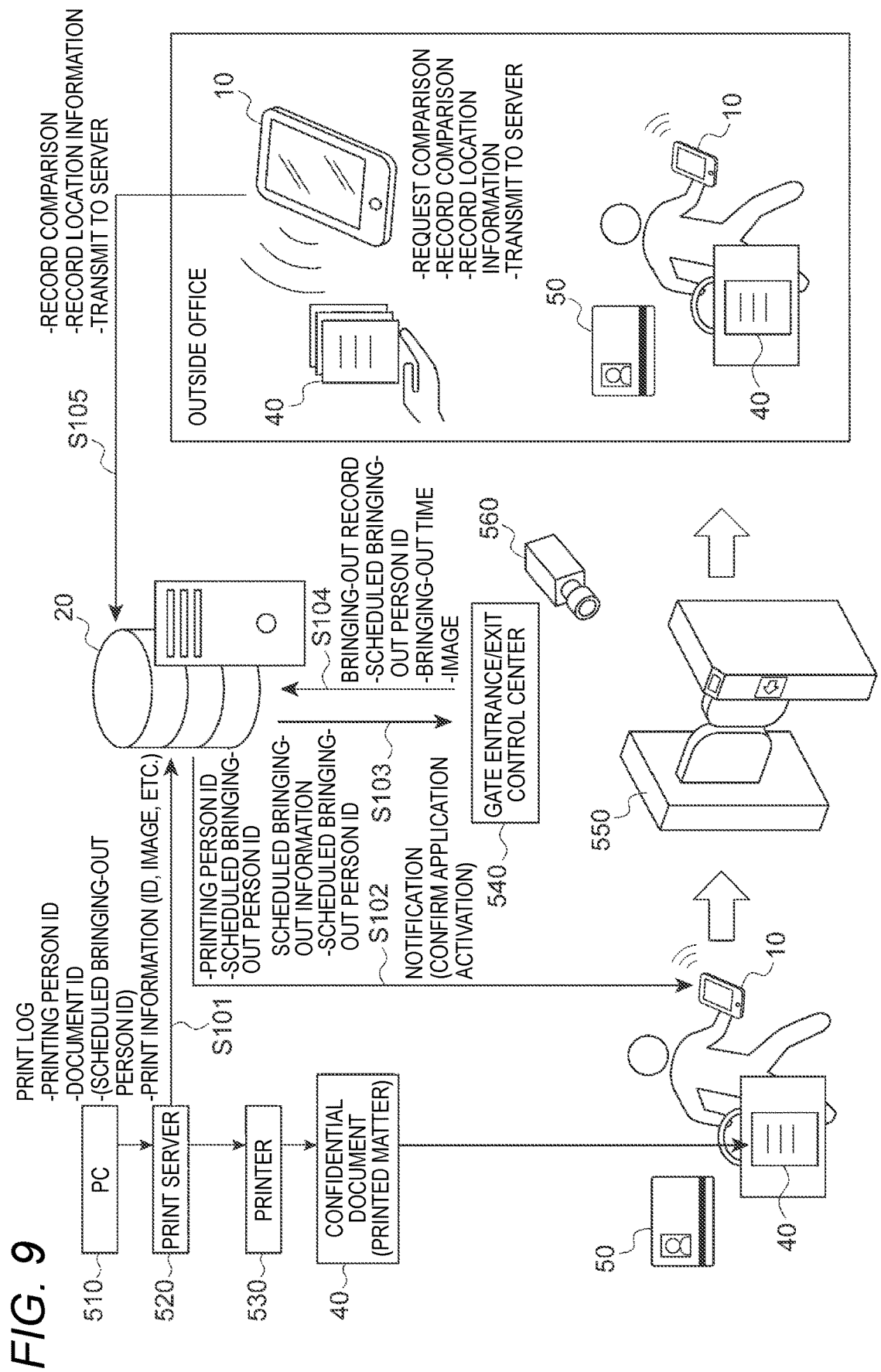
FIG. 9 is a diagram illustrating a use case example of the confidential information management system according to the present exemplary embodiment.

FIG. 9 is a diagram illustrating an example of the use case 1 of the confidential information management system 1 according to the present exemplary embodiment. The printing person of the confidential document instructs a print server 520 to print the confidential document from a PC 510 of the company. Upon receiving the print instruction of the confidential document from the PC 510, the print server 520 transmits a print log to the information storage device 20 (step S101). The print log transmitted from the print server 520 to the information storage device 20 includes the printing person ID who performs the printing, the scheduled bringing-out person ID who is scheduled to bring out the printed confidential document, and print information including the document ID and a document image. The printing person ID and the scheduled bringing-out person ID may be the same person.

The print server 520 transmits a print job to a printer 530 based on an instruction to print the confidential document sent from the PC 510. The printer 530 prints the confidential document based on the print job transmitted from the print server 520. The printed confidential document is brought out as the medium 40. In a case where the medium 40 is an object that is configured to enclose a document such as an envelope or a case, the printed confidential document is brought out while being enclosed in the medium 40. In FIG. 9, the print server 520 and the information storage device 20 are illustrated as separate devices, but the print server 520 and the information storage device 20 may be the same device.

In a case where the medium 40 is paper, the substance that is detectable with the sensor 18 may be applied to a front surface on which the information is printed, or may be applied to a back surface on which the information is not printed. In a case where the substance that is detectable with the sensor 18 is a visible substance, the substance may be applied to a region where the information is not printed, for example, a margin part at the time of printing.

The bringing-out person that brings out the medium 40 from the office carries the information processing device 10 together with the medium 40. When the information storage device 20 receives the print log from the print server 520, the information storage device 20 notifies the information processing device 10 carried by the bringing-out person of activation confirmation of an application for sensing the medium 40 and recording information (step S102). In response to the notification from the information storage device 20, the information processing device 10 displays the content of the notification on the display unit 16. The user of the information processing device 10 views the notification displayed on the display unit 16 and activates the application for sensing the medium 40 and recording information. After the activation of the application, the information processing device 10 receives the document ID and the bringing-out person ID transmitted from the information storage device 20 by the activated application.

When the information storage device 20 receives the print log from the print server 520, the information storage device 20 transmits the information on the scheduled bringing-out person ID to a gate entrance/exit control center 540 that manages gate entrance/exit with respect to the office (step S103). The gate entrance/exit control center 540 manages information of an employee that passes through an entrance/exit gate 550. When the bringing-out person bringing out the medium 40 from the office scans an ID card 50 in which an employee ID is recorded at the entrance/exit gate 550 and passes through the entrance/exit gate 550, the gate entrance/exit control center 540 transmits a bringing-out record to the information storage device 20 (step S104). The bringing-out record may include, for example, the employee ID of the employee that passes through the entrance/exit gate 550 (that is, the scheduled bringing-out person ID), a bringing-out time, and an image captured by a monitoring camera 560.

Outside the office, the information processing device 10 senses the substance included in the medium 40 with the sensor 18 constantly or at a predetermined interval. The information processing device 10 records the sensing result by the sensor 18 together with the information on the user of the information processing device 10, and transmits the recorded information to the information storage device 20 (step S105). When recording the sensing result by the sensor 18, the information processing device 10 may record the information on the current location acquired by the location information sensor.

The information storage device 20 stores the information transmitted from the information processing device 10. By storing the information transmitted from the information processing device 10, the information storage device 20 may track the medium 40 carried out of the office

[Use Case 2]

Next, as a second use case, an example case will be described in which a confidential document is printed by a printer that is available by an unspecified person in a convenience store or the like, and a printing person carries the printed confidential document.

Figure 10:
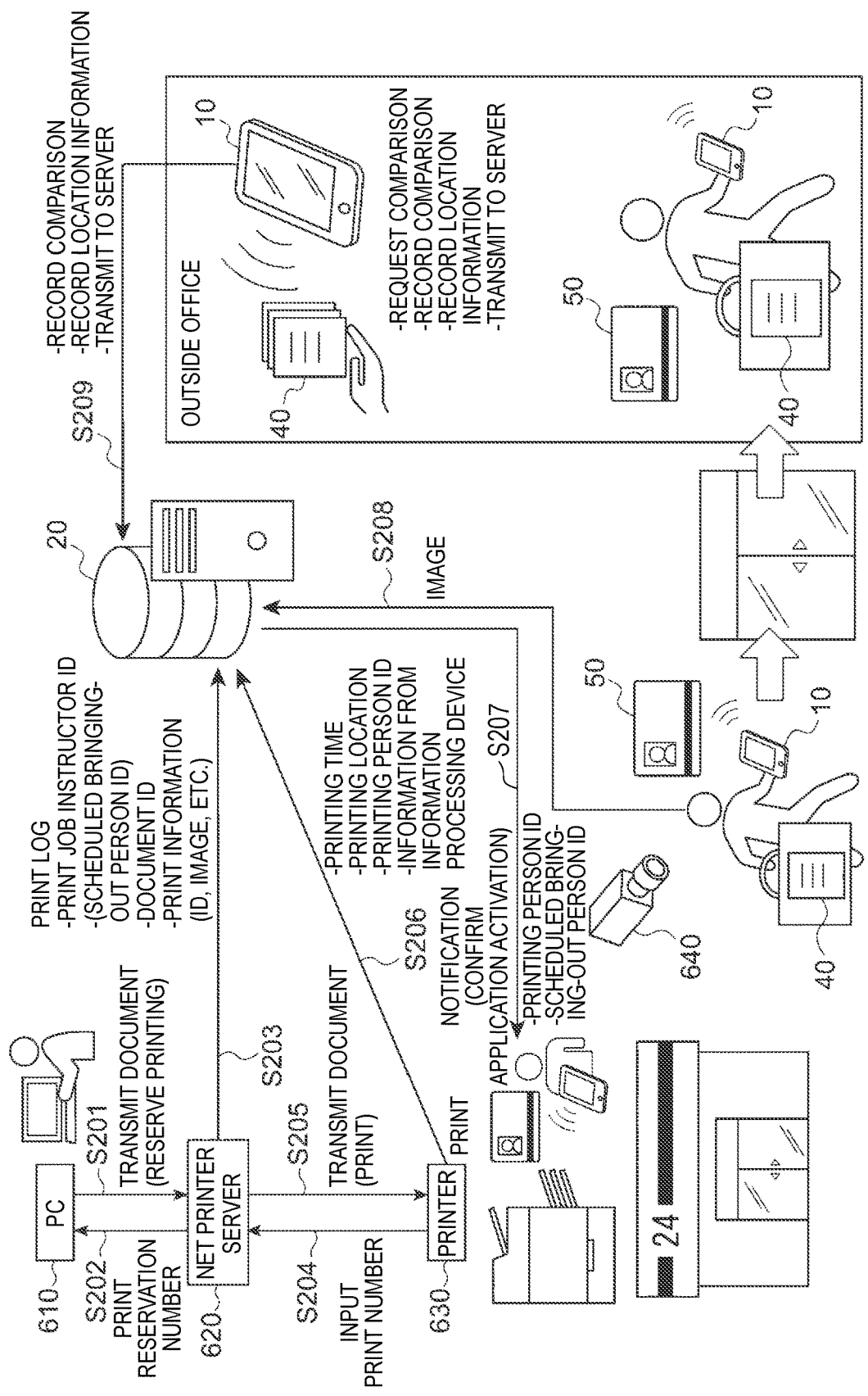
FIG. 10 is a diagram illustrating a use case example of the confidential information management system according to the present exemplary embodiment.

FIG. 10 is a diagram illustrating an example of the use case 2 of the confidential information management system 1 according to the present exemplary embodiment. The printing person of the confidential document reserves printing by transmitting the data of the confidential document to a net print server 620 from a PC 610 in the company or at home (step S201). When the print reservation is received from the PC 610, the net print server 620 transmits a reservation number to the PC 610 (step S202).

Upon receiving the print reservation of the confidential document from the PC 610, the network print server 620 transmits a print log to the information storage device 20 (step S203). The print log transmitted from the net print server 620 to the information storage device 20 includes a print job instructor ID who performs the print reservation, a scheduled bringing-out person ID who is scheduled to bring out the printed confidential document, and print information including a document ID and a document image. The printing person ID and the scheduled bringing-out person ID may be the same person.

The printing person enters the convenience store, and inputs the reservation number transmitted to the PC 610 in step S202 to the printer 630. The input of the reservation number to the printer 630 may be directly performed by the printing person or may be transmitted from the information processing device 10 carried by the printing person. The printer 630 transmits a reservation number to the net print server 620 (step S204). The network print server 620 transmits the print data transmitted from the PC 610 at the time of the print reservation from the PC 610 to the printer 630 (step S205). The application for sensing the medium 40 to record information, which will be described later, may be activated at the time of transmitting the reservation number in step S204 described above, or the reservation number may be transmitted by the activated application to the net print server 620.

The printer 630 prints the confidential document based on the print job transmitted from the net print server 620. The printed confidential document is brought out as the medium 40. When the medium 40 is an object that encloses a document such as an envelope or a case, the printed confidential document is brought out while being enclosed in the medium 40. In FIG. 10, the print server 620 and the information storage device 20 are illustrated as separate devices, but the print server 620 and the information storage device 20 may be the same device.

The printer 630 transmits the print log to the information storage device 20 at the time of printing the printed document (step S206). The printer 630 transmits a printing time, a printing location, a printing person ID that is an ID of the printing person, and the information from the information processing device 10 carried by the printing person as the print log to be transmitted to the information storage device 20 in step S206.

The bringing-out person that brings out the medium 40 from the convenience store carries the information processing device 10 together with the medium 40. When the information storage device 20 receives the print log from the printer 630, the information storage device 20 notifies the information processing device 10 carried by the bringing-out person of activation confirmation of an application for sensing the medium 40 and recording information (step S207). In response to the notification from the information storage device 20, the information processing device 10 displays the content of the notification on the display unit 16. The user of the information processing device 10 views the notification displayed on the display unit 16 and activates the application for sensing the medium 40 and recording information. After the activation of the application, the information processing device 10 receives the document ID and the bringing-out person ID transmitted from the information storage device 20 by the application. When the bringing-out person exits the convenience store, an image captured by the monitoring camera 640 installed in the convenience store may be transmitted to the information storage device 20 (step S208).

When the bringing-out person exits the convenience store, the information processing device 10 senses the substance included in the medium 40 with the sensor 18 constantly or at a predetermined interval. The information processing device 10 records the sensing result by the sensor 18 together with the information on the user of the information processing device 10, and transmits the recorded information to the information storage device 20 (step S209).

The information storage device 20 stores the information transmitted from the information processing device 10. By storing the information transmitted from the information processing device 10, the information storage device 20 may track the medium 40 carried out of the company.

[Use Case 3]

Next, as a third use case, a case will be described in which a confidential document carried out from a company is brought into the company again and the confidential document is discarded in the company.

Figure 11:
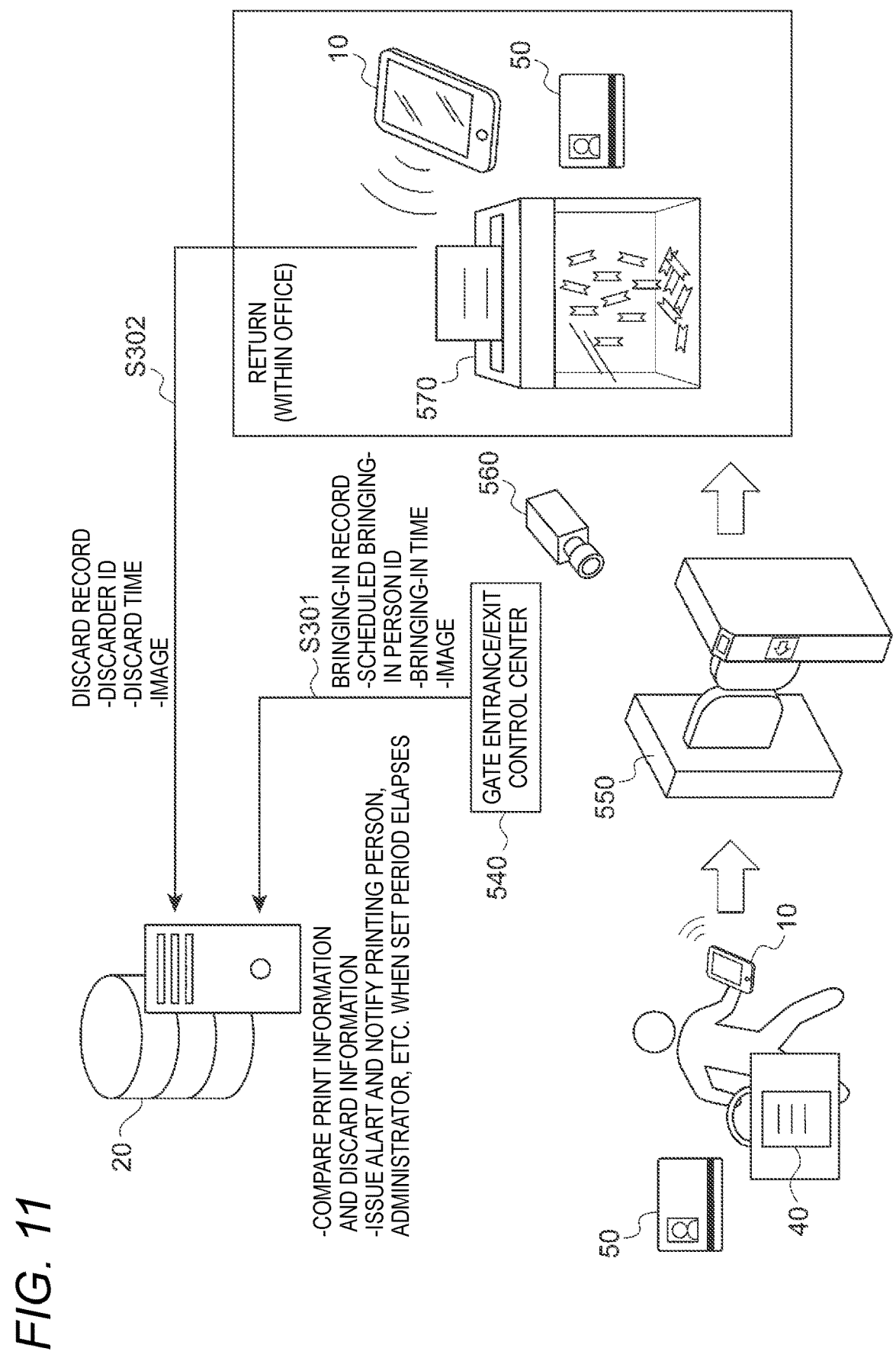
FIG. 11 is a diagram illustrating a use case example of the confidential information management system according to the present exemplary embodiment.

FIG. 11 is a diagram illustrating an example of the use case 3 of the confidential information management system 1 according to the present exemplary embodiment. When the employee who brings out the confidential document from the office (a bringing-out person) returns to the office and passes through the entrance/exit gate 550, the gate entrance/exit control center 540 transmits a bringing-in record to the information storage device 20 (step S301). The bringing-in record may include, for example, the employee ID of the employee that passes through the entrance/exit gate 550 (that is, a bringing-in person ID), a bringing-in time, and an image captured by a monitoring camera 560.

The employee who brings out the confidential document discards the confidential document by cutting the confidential document with a shredder 570 in the office. When the employee discards the confidential document, the employee scans the ID card 50 at the shredder 570. The shredder 570 acquires the information on the employee ID by the ID card 50 being scanned. The shredder 570 has a function of communicating with the information storage device 20. When the document is cut, the shredder 570 transmits the information on the employee ID acquired from the ID card 50 to the information storage device 20. Further, when the employee discards the document, the shredder 570 transmits the information on the discarded document to the information storage device 20. In addition, a sensor of the same type as the sensor 18 incorporated in the information processing device 10 may be provided in the shredder 570. Since the sensor of the same type as that of the sensor 18 is provided in the shredder 570, the shredder 570 may reliably transmit the document ID of the cut confidential document to the information storage device 20.

The information storage device 20 stores discard information transmitted from the information processing device 10 and the shredder 570. The discard information transmitted from the information processing device 10 and the shredder 570 may include an ID acquired from the ID card 50 (discarder ID) and discarded document information. Further, in a case where a monitoring camera is present around the shredder 570, an image captured by the monitoring camera may be included in the discard information. The information storage device 20 may grasp that the confidential document is discarded by storing the information transmitted from the information processing device 10 and the shredder 570.

In a case where a document that is not discarded even after the scheduled discard date and time elapses is present, the notification unit 204 of the information storage device 20 may notify the information processing device 10 of the user who brings out the document or the information processing device 10 of the administrator that the scheduled discard date and time elapses. The notification unit 204 may grasp from the information 210 recorded in the storage 24 that a document that is not discarded even after the scheduled discard date and time elapses is present. The notification unit 204 may notify that the scheduled discard date and time elapses immediately after the scheduled discard date and time elapses, or may notify that the scheduled discard date and time elapses after a predetermined period of time elapses from the scheduled discard date and time.

The confidential document may be stored as confidential information in a storage location such as an archive without being cut. When the employee who brings out the confidential document stores the confidential document in the storage location, the information storage device 20 acquires and stores the employee ID and the document ID. The employee ID is acquired, for example, by scanning the ID card 50 at a predetermined location of the storage location where confidential information is stored (for example, a card reader at an entrance). The document ID of the confidential document stored may be transmitted to the information storage device 20 by the employee operating the information processing device 10 at a timing when the confidential document is stored. The document ID may be transmitted to the information storage device 20 by a communication device including a sensor of the same type as the sensor 18 when the sensor detects that the confidential document is stored in a predetermined place. Further, at a timing when the storage location is locked after the confidential document is stored in a predetermined location, the document ID of the stored confidential document may be transmitted to the information storage device 20.

When the confidential document is stored as confidential information in a storage location such as an archive, the information storage device 20 may store information on a scheduled storage start date and time in place of the information on the scheduled discard date and time or in addition to the information on the scheduled discard date and time. In a case where a document that is not stored even after the scheduled storage start date and time elapses is present, the notification unit 204 of the information storage device 20 may notify the information processing device 10 of the user who brings out the document or the information processing device 10 of the administrator that the scheduled storage start date and time elapses. The notification unit 204 may grasp from the information 210 recorded in the storage 24 that a document that is not stored in the storage location even after the scheduled storage start date and time elapses is present. The notification unit 204 may notify that the scheduled storage start date and time elapses immediately after the scheduled storage start date and time elapses, or may notify that the scheduled storage start date and time elapses after a predetermined period of time elapses from the scheduled storage start date and time.

The information recording processing executed by the CPU reading software (program) in each of the above-described exemplary embodiments may be executed by various processors other than CPU. Examples of the processor in this case include a programmable logic device (PLD) whose circuit configuration is changeable after manufacture of a field-programmable gate array (FPGA) or the like, a dedicated electric circuit being a processor having a circuit configuration designed exclusively to execute specific processing such as an application specific integrated circuit (ASIC), and the like. In addition, the information recording process may be executed by one of the various processors, or may be executed by a combination of two or more processors of the same type or different types (for example, a plurality of FPGAs, a combination of a CPU and an FPGA, or the like). More specifically, the hardware structures of these various processors are electric circuits in which circuit elements such as semiconductor elements are combined.

Further, in each of the above exemplary embodiments, an aspect in which the program of the information recording processing is stored (installed) in the ROM or the storage in advance has been described, but the present invention is not limited thereto. The program may be provided in a form recorded in a non-transitory recording medium such as a compact disk read only memory (CD-ROM), a Digital versatile disk read only memory (DVD-ROM), and a universal serial bus (USB) memory. Alternatively, the program may be downloaded from an external device via a network.

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device, comprising:
    a sensor configured to detect a substance applied to a medium containing confidential information; and
    a processor configured to record information including substance information identifying the substance detected with the sensor and user information on a user carrying the medium in combination, wherein the processor changes an acquisition frequency of detecting the substance with the sensor depending on whether the user moves out of a predetermined area.

2. The information processing device according to claim 1, wherein,
    in a case where the user moves out of the predetermined area, the processor increases the acquisition frequency of detecting the substance with the sensor as compared with a case where the user is in the predetermined area.

3. The information processing device according to claim 1, wherein
    the sensor includes a location information sensor configured to acquire location information, and
    the processor further records the location information acquired with the location information sensor in combination.

4. The information processing device according to claim 1, wherein the sensor is a sensor configured to detect, as the substance, an odorless substance.

5. The information processing device according to claim 1, wherein
    the sensor is a sensor configured to detect, as the substance, a substance that generates a magnetic force.

6. The information processing device according to claim 1, wherein
    the sensor is a sensor configured to detect, as the substance, a substance that absorbs or reflects millimeter waves.

7. The information processing device according to claim 1, wherein
    the sensor is a sensor configured to detect, as the substance, an image.

8. The information processing device according to claim 7, wherein
    the sensor is a sensor configured to detect a two-dimensional code as the image.

9. An information management system comprising:
an information processing device; and
an information storage device, wherein
the information processing device includes
- a sensor configured to detect a substance applied to a medium containing confidential information, and
- a first processor configured to
  - record information including substance information identifying the substance detected with the sensor and user information on a user carrying the medium, and
  - transmit the recorded information to the information storage device, and the information storage device includes
- a second processor configured to manage location information on a location of the medium by using the information transmitted by the first processor, wherein the second processor instructs the information processing device to start detection of the substance in a case where the user carrying the medium moving out of a predetermined area.

10. The information management system according to claim 9, wherein
the second processor instructs the information processing device to detect the substance at a predetermined timing.

11. The information management system according to claim 9, wherein
the first processor notifies the information storage device that the substance is not detected in a case where the substance is not detected with the sensor.

12. The information management system according to claim 9, wherein
the second processor outputs, when a discard time limit elapses without discarding the confidential information, a notification indicating that a discard time limit elapses.

13. A non-transitory computer readable storage medium storing a program for causing a computer to execute a process of:
- recording information including substance information identifying a substance applied to a medium containing confidential information and detected with a sensor for detecting the substance and user information on a user carrying the medium in combination, and
- change an acquisition frequency of detecting the substance with the sensor depending on whether the user moves out of a predetermined area.

* * * * *